N. W. WHEELER.
Fresh Water Still.
No. 52,476. Patented Feb. 6, 1866.
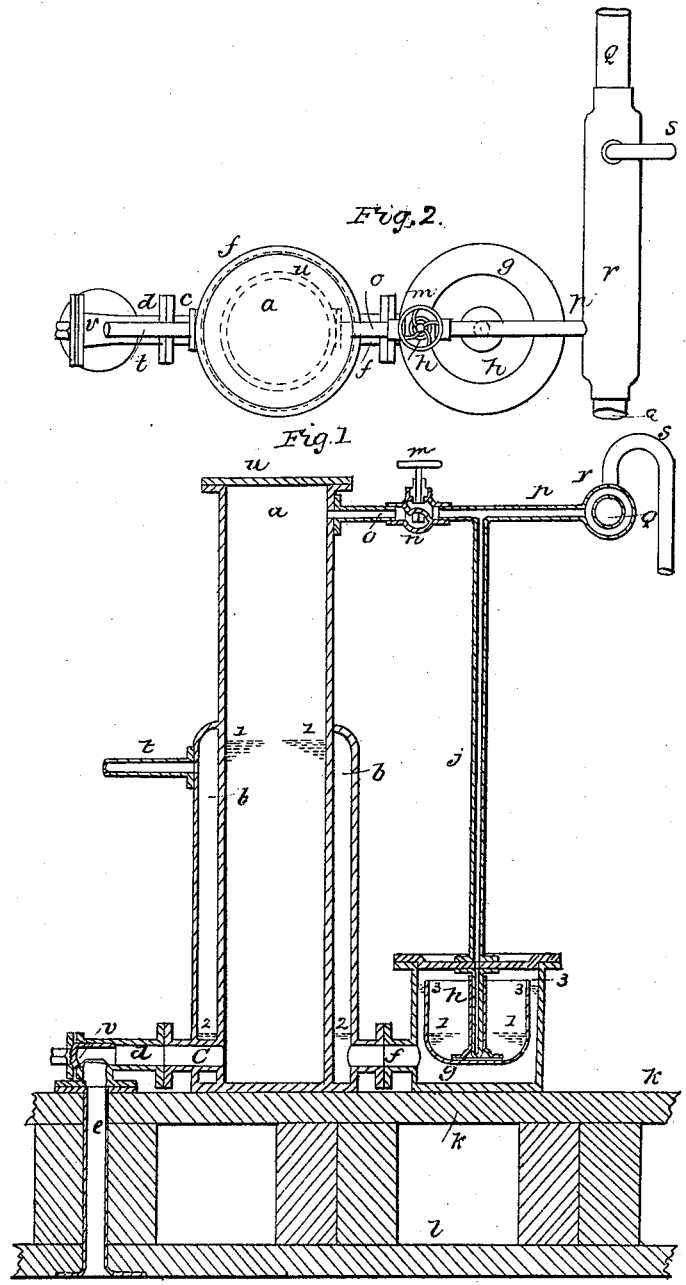

UNITED STATES PATENT OFFICE.

NORMAN W. WHEELER, OF BROOKLYN, NEW YORK.

IMPROVEMENT IN STILLS FOR DISTILLING SALT-WATER.

Specification forming part of Letters Patent No. 52,476, dated February 6, 1866; antedated December 26, 1865.

*To all whom it may concern:*

Be it known that I, NORMAN W. WHEELER, of Brooklyn, in the county of Kings and State of New York, have invented a new and useful Improvement in Fresh-Water Stills for Seagoing Vessels or Ships; and I do hereby declare that the following is a full and exact description thereof.

The essence of my invention consists in combining a static column of water, communicating when the apparatus is in use with the water in which the ship floats, with suitable steam-heating surface and automatic discharge in such a way that it will distill pure water from salt or otherwise impure water without requiring attention or manipulation, except at long intervals of time.

To enable others skilled in the art to make and use my invention, I will proceed to describe it by the aid of drawings, making a part of this specification, of which—

Figure 1 is a sectional elevation, and Fig. 2 a plan, like letters of reference indicating the same parts in the different drawings.

In Figs. 1 and 2, $a$ is a tall metallic vessel of any convenient shape, so placed in the ship with reference to the surface of the water in which she floats that the top of the vessel $a$ shall be higher when she is deep loaded and the bottom below the surface when she is light. The top of the vessel $a$ is closed by the cap $u$. $b\ b$ is a steam-jacket surrounding the lower part of the vessel $a$. $c$ is a nozzle communicating with the lower part of the vessel $a$, and $f$ a nozzle communicating with the lower part of the steam-jacket $b\ b$. $t$ is a steam-pipe leading from a steam-boiler into the upper part of the steam-jacket $b\ b$, and $o$ is a discharge-pipe leading from the upper part of the vessel $a$. $v$ is a stop cock or valve, communicating with the sea by means of the pipe $e$, and with the nozzle $c$ by the pipe $d$. $n$ is a check-valve opening outward from the vessel $a$ and pipe $o$, to allow the escape of vapor from and prevent the return of vapor and liquid to the vessel $a$. $m$ is a hand-wheel, so arranged that by turning it the check-valve $n$ may be closed or made free to open at will. $g$ is a steam-trap, (of well-known construction and in common use, of which $h$ is the floating pot and $i$ the discharge-pipe,) connected at the nozzle $f$ to the lower part of the steam-jacket $b\ b$. $j$ is a continuation of the discharge-pipe $i$; $p$, a continuation of the pipe $o$; $r$, a jacket around a portion of the feed-pipe $q\ q$ of the boiler, and $s$ a final discharge-pipe leading to a proper receptacle for the fresh water.

To put this apparatus in operation, the stopcock $v$ should be opened, steam above atmospheric pressure be let into the jacket $b\ b$ through the pipe $t$, and the wheel $m$ turned so as to allow the check-valve $n$ to open, when the salt or impure water will flow through the pipe $e$, cock $v$, pipe $d$, and nozzle $c$ into the vessel $a$ and fill it level with the out-board surface—say to 1 1—while steam will fill the jacket $b\ b$ and trap $g$.

It will generally occur that the heat abstracted from the steam at the instant of contact with the metal of the apparatus will cause the condensation of water enough to float the pot $h$ and prevent the escape of steam through the pipes $i$ and $j$. When this is not the case a stop-cock should be placed in the pipe $j$ and opened after sufficient condensation has taken place.

The apparatus being in the condition before described, heat from the steam in the jacket $b\ b$ will pass through the walls of the vessel $a$ and cause the water in $a$ to boil, the vapor passing out through the pipe $o$, check-valve $n$, and pipe $p$ into the jacket $r$, where the passing feed-water in the pipe $q\ q$ will condense it into water, which will flow through the pipe $s$ into tanks, hot-wells, or wherever desired. The loss of water in the vessel $a$ by vaporization will be supplied by a slow current upward through the pipe $e$, &c., and, according to a well-known law, the water contained in these pipes will not be heated much below the jacket $b\ b$.

The abstraction of heat from the steam contained in the jacket $b\ b$ will cause it to condense into water and fall to the bottom, the loss being continually supplied from the boiler through the pipe $t$. When water enough has condensed to bring the surface above the nozzle $f$ the continued accumulation will cause it to rise in the trap $g$ by reason of the pressure upon the surface in the jacket $b\ b$ and float the pot $h$, so that its bottom is held tightly against the lower end of the pipe $i$, thus closing the orifice and preventing any escape; but when the water has accumulated in such quantity as to fill the trap to the top of the pot $h$ it will run over and fill the pot $h$, when it will sink and its bottom leave contact with the end of the pipe $i$, and the water within the pot $h$ will be forced up through the pipes $i$ and $j$ by virtue of the pressure in the jacket $b\ b$ and trap $g$ until, the water being nearly all driven out of the pot $h$, it will again float in the water surrounding it and close the pipe $i$ until another accumulation and sinking occurs, and so on while the apparatus is in use. The water forced from the trap $g$ passes through the pipes $i, j$, and $p$ into the jacket $r$, and is cooled by the passing feed-water in the pipe $q\ q$, as before described in the case of the vapor from the vessel $a$, although the pipe $j$ may lead directly to the condenser or hot-well, or get to the potable-water tanks, yet the heat contained in it is best transferred direct to the feed-water, so that little is lost by the fact of distillation, and so that the fresh water will not retain an undue amount of heat. In this connection it is well to say that the pipe $o$ should not be connected to a condenser wherein a vacuum is maintained, as in that case it would extend to the vessel $a$ and draw over the impure water and defeat the object in view.

When the periodic discharges from the trap $g$ take place the pressure in the pipe $p$ may exceed that in the vessel $a$ and the condensed water have a tendency to flow back through the pipe $o$ into the vessel $a$, where, should this occur, the condensed water would mingle with the impure water; but in that case the check-valve will close and prevent it, and reopen for the passage of vapor when the discharge shall have ceased.

Thus far the described action of the apparatus is automatic, after having once been set in operation. After a considerable time, however, the water in the vessel $a$ will be found to have the impurities concentrated to a degree that will require the substitution of less impure water in its stead. This can be accomplished by turning the hand-wheel $m$ so as to close the check-valve $n$ and prevent the escape of vapor, when the continued vaporization will generate a sufficient degree of pressure in the vessel $a$ to force the water downward and out through the pipe $d$, cock $v$, &c., and nearly empty the vessel $a$, the accomplishment of which can be ascertained by means of a try-cock inserted in the nozzle $c$, for instance. When the impure water has been expelled, as described, a new supply may be admitted by reopening the check-valve $n$, when the pressure will be relieved and water again flow into the vessel $a$ and distillation proceed, as before.

After long use it will be found that the interior of the vessel $a$ will need cleaning, and if working in salt-water a coating of scale will probably be found adhering to the surface, in which case it will be requisite to shut the cock $v$, remove the cap $u$, free the vessel $a$ of water, and remove the impurity in the usual way in such cases.

Should the action of the still be interfered with by the pipe $e$ becoming filled with mud, which may occur if the ship takes the ground, it may be cleared by introducing water into the vessel $a$, if none be there, and turning steam into the jacket after having closed the check-valve $n$, when the pressure generated will usually clear away obstructions.

It is obvious that the water condensed in the jacket $b\ b$ may be returned to the working-boilers with but little loss in quantity, and that the water derived from vaporization in the vessel $a$ may be added to the existing stock of pure water and make good the wastage occurring about the boilers and engines, or that it may be used for other purposes without subtracting from the supply in the boilers.

It is easy to see that a similar result may be attained by suppressing the steam-jacket $b\ b$ and substituting a series of steam-pipes within the vessel $a$, and that that arrangement would be useful; but I prefer the mode of construction before described on account of convenience of access and cheapness of construction. In this last respect this apparatus is superior to those heretofore known and used, nearly or quite all of them having been constructed of great numbers of pipes and pieces, and usually requiring especial pumps, gages, and instruments, as well as almost constant attendance while in use, and frequent repairs.

With my invention many of the annoyances and losses and much of the expense heretofore endured may be avoided.

I find, in practice, that if the vessel $a$ and jacket $b\ b$ be made of cast-iron and in one piece it makes an efficient still, and, besides cheapness, has freedom from leakage caused by different expansions of different parts to recommend it, which cannot be the case with those which are composed of numbers of pipes and pieces.

An inspection of the drawings will show that very little composition or other high-priced material need be used, and that the amount of labor required to construct my apparatus will be comparatively small.

There have been attempts made to procure pure water by vaporizing the upper portions of static columns by building within the ship water-tight boxes or stand-pipes, with their tops closed and extending above the outboard surface, those portions of the bottom of the ship corresponding to the bottoms of the boxes being cut away, and with steam-pipes traversing the boxes; but it is easy to see that in a seaway the motion of the water within the boxes would defeat the object by continually changing the water, that the apparatus would be a source of danger to the ship from possible leakage, and that many of the parts would be inaccessible for cleaning or repair while in place unless the ship were docked.

Having now fully described my invention, I will set forth what I claim as new and for which I desire to secure Letters Patent, to wit:

1. The combination of the vessel $a$, steam-jacket $b\ b$, trap $g$, and sea-cock $v$, or their equivalents, substantially as described.

2. The combination of the valve $n$, vessel $a$, jacket $b\ b$, and sea-cock $v$, or their equivalents, substantially as described.

3. The combination of the cooling-jacket $r$, or its equivalent, upon the feed-pipe $q\ q$, with an automatic still, substantially as described.

NORMAN W. WHEELER.

Witnesses:
JOHN VAN AMRINGE,
C. H. CORBETT.